No. 784,912. PATENTED MAR. 14, 1905.
M. L. BEISTLE.
MACHINE FOR MANUFACTURING ARTIFICIAL FLOWERS.
APPLICATION FILED MAR. 14, 1904.
2 SHEETS—SHEET 1.
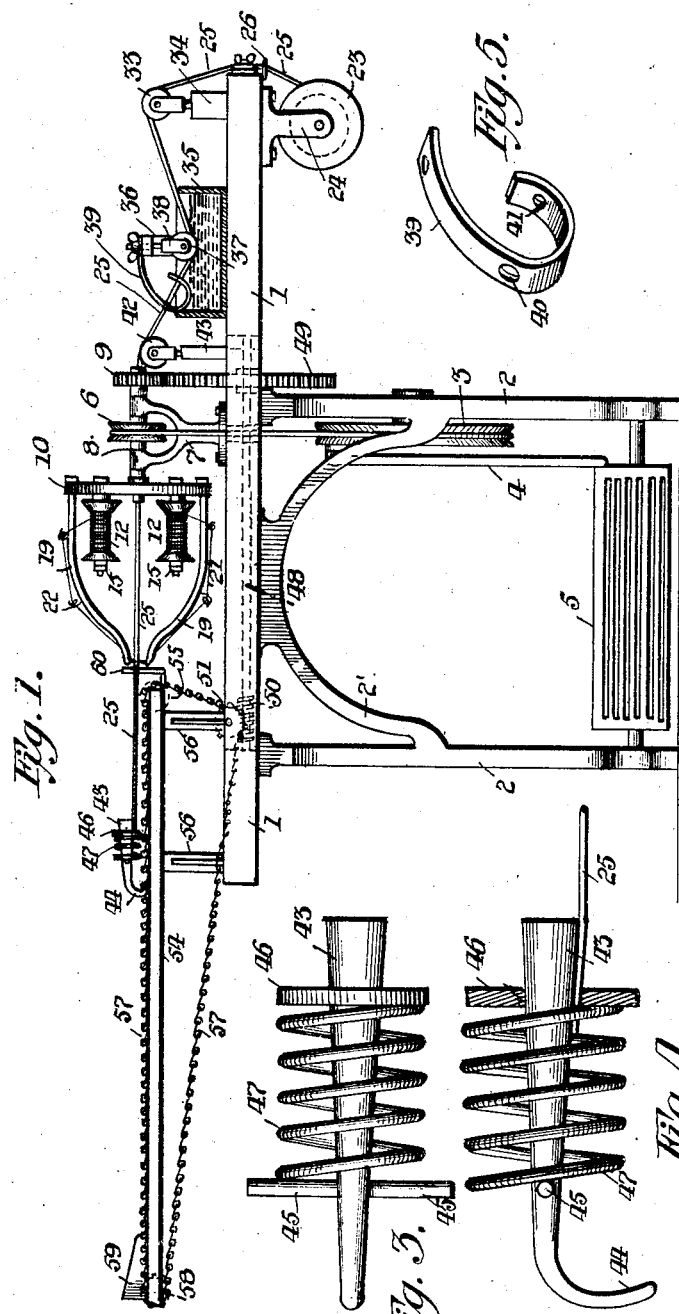
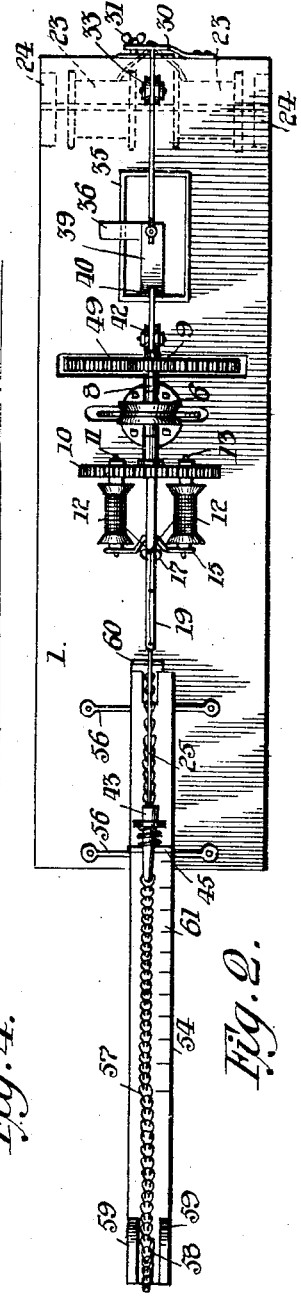
Witnesses:
K. H. Butler
E. E. Potter
Inventor
M. L. Beistle,
By N. C. Everitt Co.
Attorneys No. 784,912. PATENTED MAR. 14, 1905.
M. L. BEISTLE.
MACHINE FOR MANUFACTURING ARTIFICIAL FLOWERS.
APPLICATION FILED MAR. 14, 1904.
2 SHEETS—SHEET 2.
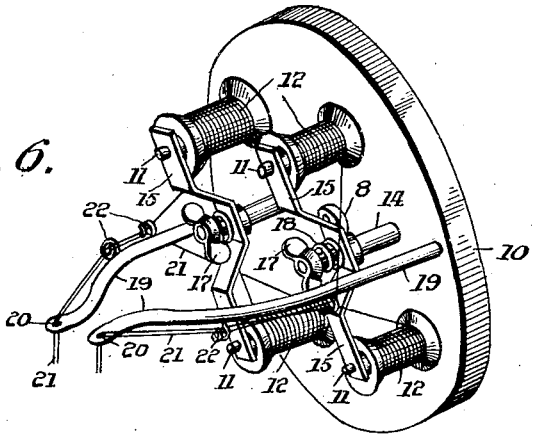
Fig. 6.
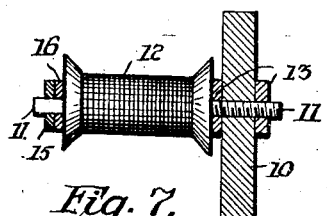
Fig. 7.
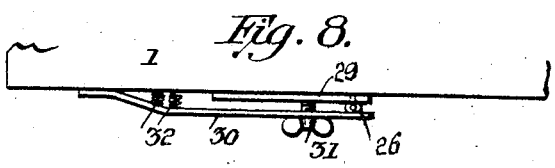
Fig. 8.
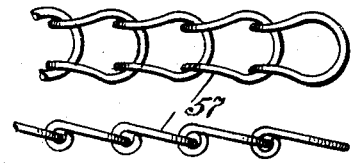
Fig. 9.
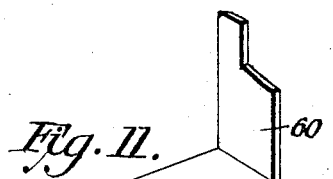
Fig. 10.
Fig. 11.
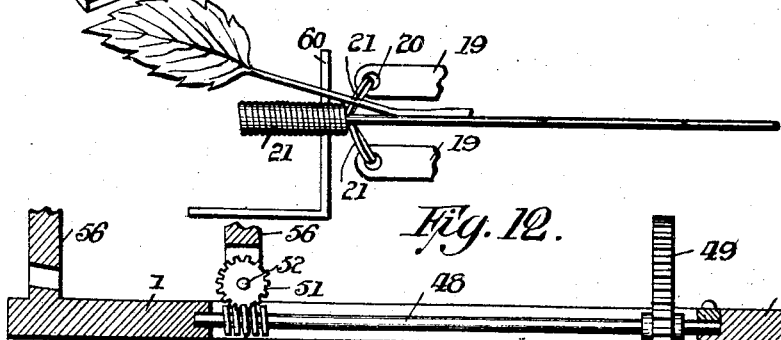
Fig. 12.
Fig. 13.
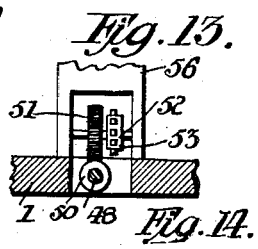
Fig. 14.
Witnesses:
Inventor
M. L. Beistle,
By
Attorneys.

No. 784,912. Patented March 14, 1905.

UNITED STATES PATENT OFFICE.

MARTIN L. BEISTLE, OF INGRAM, PENNSYLVANIA.

MACHINE FOR MANUFACTURING ARTIFICIAL FLOWERS.

SPECIFICATION forming part of Letters Patent No. 784,912, dated March 14, 1905.

Application filed March 14, 1904. Serial No. 198,000.

*To all whom it may concern:*

Be it known that I, MARTIN L. BEISTLE, a citizen of the United States of America, residing at Ingram, in the county of Allegheny and State of Pennsylvania, have invented certain new and useful Improvements in Machines for Manufacturing Artificial Flowers, of which the following is a specification, reference being had therein to the accompanying drawings.

This invention has relation to machines for manufacturing artificial flowers, and has for its object the provision of novel means whereby stems for artificial flowers may be rapidly and automatically produced, and has for its further object the provision of means whereby artificial leaves and flowers may be attached to artificial stems during the manufacture of the latter.

My invention further aims to provide novel means whereby the stems of leaves and flowers may be attached to vines or other stems while the machine is in continuous operation.

I propose to manufacture stems for artificial flowers by wrapping the stems with strands of fibrous material, such as cotton thread, and I propose to attach the leaves or flowers to the stems during the course of the wrapping operation by winding the thread by means of which the wire composing the body of the stem is covered around a portion of the wire on which the leaves or flowers are mounted, by this means securing a firm attachment of the leaves or flowers to the stem and producing an appearance closely resembling the connection of these parts in nature.

The invention consists in the novel construction, combination, and arrangement of parts invented by me for the production of artificial-flower stems hereinafter described and claimed.

In the accompanying drawings, illustrating my invention, Figure 1 is a side elevation of the complete apparatus adapted to perform the operation above referred to. Fig. 2 is a top plan view of the same. Figs. 3 and 4 are detailed views in plan and section, respectively, of the clamping device employed in connection with the machine shown in views 1 and 2. Fig. 5 is a perspective view of a scraper which I employ in connection with my apparatus to remove superfluous adhesive material. Fig. 6 is a perspective view of the thread-winding mechanism. Fig. 7 is a detailed view, partly in section, of a portion of the thread-winding mechanism. Fig. 8 is a top plan view of part of the machine and tension device applied thereto. Fig. 9 is a plan view, and Fig. 10 is a side view, of a chain by means of which the fitted mechanism of the machine shown in Fig. 1 is operated. Fig. 11 is a perspective view of a guide-plate for the wire. Fig. 12 is a side elevation of the wire-guide and thread-winding needles, showing a wire partly wound and a leaf in position to be attached thereto. Fig. 13 is a vertical longitudinal sectional view of part of the table of the machine. Fig. 14 is a vertical transverse sectional view of the same.

The operating mechanism of the apparatus constituting my invention is mounted on a table 1, which is supported by side frames 2, connected by a brace 2'. A grooved fly-wheel 3 is mounted on one of the side frames 2 and is driven by a pitman 4, driven by a treadle 5. Motion is communicated from the fly-wheel 3 to a pulley 6, journaled in a standard 7 on top of table 1, said pulley being fixed on a hollow rotary shaft 8, which extends beyond the arms of the standard 7, said shaft carrying on one end a pinion 9 and on the other end a head 10. The head 10, which is shown on an enlarged scale in the perspective view Fig. 6, has four pins 11 on its outer face, and on said pins 11 are mounted four spools of thread 12. It will of course be understood that more than four pins and spools can be mounted on the head 10 when it is desired to use a greater quantity of thread than can be obtained from four spools. The pins are secured in the head 12 by means of nuts 13 on each side of the head. Standards 14 are fixed on the head and carry curved clips 15, which have pierced ends through which the pins 11 pass, and washers 16 are inserted between the ends of the clips 15 and the heads of the spools 12. The clips 15 are held on the standards 14 by means of thumb-nuts 17 and spiral springs 18, interposed between the thumb-nuts and the clips. This combination is used whereby the spools of thread may be held under tension and regulated by the thumb-nuts 17. Needles 19 are fixed at diametrically opposite points on the head, said needles having inwardly-curved outer ends formed with eyes 20, through which the threads 21 from the spools 12 pass, two or more threads passing through each eye. Eyelets 22 are fixed on the sides of the needles 19 to guide the thread from the spools to the eyes 20. These needles are made long and so arranged as to allow the long stems of flowers or leaves to be attached on the gummed wire or wires, and the needles have their outer ends so bent as to permit the thread to be wound close to leaf or flower being attached.

Beneath the table 1 and near one end thereof one or more wire reels or spools 23 are mounted in hangers 24, and the wire 25 from the spool or spools 23 passes up and around the end of the table through an eyelet 26 and through a tension device, which is shown in detail in Fig. 8. This tension device consists of a plate 29, secured to the end of the table, and the bent spring-plate 30, which overlaps the plate 29 and is adjusted toward and from said plate by a thumb-screw 31. Spiral springs 32 may be inserted between the spring-plate 30 and the end of the table to add resiliency thereto. The wire from the reel or reels 23 passes between the spring-plate 30 and the plate 29, and the desired tension thereon is secured by the adjustment of the plate 30. After passing through the tension device shown in Fig. 8 the wire 25 passes over a pulley 33, mounted on a standard 34, and from thence passes into a receptacle 35, that contains suitable adhesive material. The bracket 36 has a lateral arm that extends over the receptacle 35, and a pulley 37, which is sustained on an adjustable hanger 38, maintains the wire beneath the surface of the adhesive material in the receptacle 35, and a scraper 39 has one end attached to the lateral arm of the bracket 36, and its lower end curves inwardly, forming a half-circle, said lower end being pierced at 40 41 for the passage of the wire through the scraper. After passing through the receptacle 35 the wire passes over a pulley 42, mounted on a standard 43, and then passes through the hollow shaft 8, from where it passes in a straight line between the needles 19 to a clamping device, which is shown in detail in Figs. 3 and 4. The said clamping device consists of a tapering rod 43 having a downwardly-bent end 44 and laterally-extending arms 45. A ring 46 is loosely mounted on the tapering portion of the rod 43, the hole in the center of the ring being of less diameter than the larger end of said rod, and a spiral spring 47 is interposed between the arms 45 and ring 46 and tends to press the ring toward the larger end of the rod 43. It will be apparent from the construction of the clamping device that any size or number of wires may be firmly and quickly grasped and easily released when desired.

A shaft 48 is journaled in the table 1 and carries on one end a gear-wheel 49, that meshes with the pinion 9 on hollow shaft 8, and the said shaft 48 has on its other end a worm 50, that meshes with a worm-wheel 51, mounted above the shaft 48 on a transverse shaft 52, and on the said shaft 52 is mounted a sprocket 53.

An arm 54 is mounted on standards 56 56, the top of said arm being slightly below the level of hollow shaft 8, and a sprocket 55 is journaled at the inner end of said arm, and a similar sprocket 58 is journaled at the outer end thereof, and an endless chain 57, a section of which is shown in Figs. 9 and 10, travels around the sprockets 53 55 58, and when the wire is being drawn through the machine the hook 44 of the clamp shown in Figs. 3 and 4 is engaged in one of the links of the said endless chain 57, the wire 25 being secured in the clamp by passing it between the ring 46 and the tapering portion of the rod 43, the spring 47 serving to force the ring along the tapering portion, causing it to firmly clamp the wire. Upon the outer end of the arm 54 and on top thereof are fixed two beveled plates 59, with which the arms 45 of the wire-clamping device contact when the said clamping device reaches the extremity of the arm 54, the said arms 45 then riding up the edges of an inclined plane and this movement causing the hook 41 to be disengaged from the chain 57.

When the clamping device has been disengaged from the chain, the ring 46 is pressed backwardly and the wire thereby released from the clamping device.

The operation of the above-described machine is as follows: The wire to be wrapped, of which there may be one or more strands wrapped at a time, is brought from the reels on the end of the table through the receptacle 35 and through the hollow shaft 8 and is connected to the chain 57 by the clamping device shown in Figs. 3 and 4, the hook 44 of the clamping device being engaged in one link of the chain 57. The fly-wheel 3 being put in motion by working the treadle 5 revolves the shaft 8 and the spools 12 on the head 10, and the needles 19 are revolved around the wire, thus wrapping the wire with thread from the spools 12. As the head 10 revolves and the wire is wrapped with thread from the spools 12 the chain 57 is caused to travel by the movement of the shaft 48 and the intervening mechanism, and the chain draws the clamping device along, thus drawing the wire through the head as it is wrapped by the thread. The wire in passing through the receptacle 35 is coated with adhesive material, superfluous material being scraped off the wire by the scraper 39 as the wire runs out of the receptacle, and the adhesive material so applied causes the thread wound upon the wire to adhere thereto, so as to obviate any danger of the thread unwinding when the wrapped wire is subsequently cut into sections. If it is desirable to attach leaves or flowers upon the wire 25 as the same is being wrapped, the short wires upon which the leaves or stems are mounted is inserted between the ends of the needles 19, a guide 60 being mounted on the arm 54 in proximity to the ends of the needles to assist in locating the wires of the leaves or flowers in proper position relatively to the wire 25. The manner of introducing the wire on which the leaf is mounted is shown on Fig. 12 of the drawings, and it will be understood that the thread wrapping around the wire on which the leaf is mounted will firmly secure the leaf in position on the stem. A scale 61 is arranged on the upper side of the arm 54, the purpose of the scale being to enable the operator to place the leaves at predetermined distances apart. As soon as the wire-clamping device reaches the beveled plates 59 and becomes disengaged from the chain 57 the wire is cut just beyond the ends of the needles 19 and is then released from engagement with the wire-clamping device and the free end of wire 25 again attached to the clamping device and the operation proceeded with as before.

While I have herein shown manual means for operating my improved machine, it is obvious that a motor or any other suitable power may be employed.

Having described my invention, I claim—

1. In a machine for manufacturing artificial flowers, the combination of a wire-reel, means for wrapping the wire with thread, means for drawing sections of the wire of various predetermined lengths from the reel, means for automatically stopping the movement of the wire when the predetermined length has been drawn from the reel, and means for coating the wire with adhesive material previously to the wrapping operation.

2. In a machine of the type described, the combination of a wire-reel, an adjustable tension device located adjacent to said reel, means for wrapping thread upon the wire, means for coating the wire with adhesive material, and means for gripping the free end of the wire and drawing it a limited distance and then automatically releasing it from traction.

3. In a machine of the type described, the combination of a table, a wire-reel mounted thereon, a tension device, a receptacle for adhesive material, a scraper arranged in said receptacle, a hollow shaft, means for imparting motion to said shaft, a head carried by said shaft, spool-supporting pins mounted on said head, needles carried by said head, an endless conveyer mounted on said table, and receiving motion from the shaft-operating means, a wire-clamping device engaging said endless conveyer, and means for automatically releasing the wire-clamping device from engagement with the said conveyer.

4. In a machine of the type described, the combination of a rotary head, a spool carried on said head, a needle carried on the head at a point farther from the center of the head than said spool, the said needle projecting beyond the end of the spool and inwardly toward the axis of the head, means for feeding wire through said head, and means for rotating the head.

5. In a device of the type described the combination of a wire-reel, a rotary head, a hollow shaft on which said reel is mounted, spools mounted on said head and projecting beyond the end of said hollow shaft, and needles mounted on the head and projecting beyond the ends of the spool, said needles having eyes on their outer ends for the reception of thread from the spools, the position of the eyes in the needles being such that sufficient space would be left between the wrapped portion of the wire and the end of said hollow shaft to permit of the stem of a flower being laid along the wire between the wrapped portion of the same and the end of said hollow shaft.

In testimony whereof I affix my signature in the presence of two witnesses.

MARTIN L. BEISTLE.

Witnesses:
  H. C. EVERT,
  E. E. POTTER.